United States Patent [19]

Reinecke

[11] 4,418,965

[45] Dec. 6, 1983

[54] LOAD-CONTROLLED BRAKE PRESSURE CONTROL UNIT

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 314,349

[22] Filed: Oct. 26, 1981

[30] Foreign Application Priority Data

Nov. 7, 1980 [DE] Fed. Rep. of Germany ....... 3026252

[51] Int. Cl.³ .............................................. B60T 8/18
[52] U.S. Cl. .................................. 303/22 R; 188/195; 303/40
[58] Field of Search ................ 303/22 R, 22 A, 23 R, 303/23 A, 40, 28–30, 7, 9, 13, 50–56, 68, 69, 118, 63, 6 C; 188/195; 137/627.5

[56] References Cited

U.S. PATENT DOCUMENTS

| | | | |
|---|---|---|---|
| 3,302,982 | 2/1967 | Pekrul | 303/40 X |
| 3,411,836 | 11/1968 | Dobrikin et al. | 303/40 |
| 3,671,087 | 6/1972 | Pekrul | 303/22 R X |
| 3,927,916 | 12/1975 | Masuda | 303/6 C X |

FOREIGN PATENT DOCUMENTS

2706758  8/1978  Fed. Rep. of Germany ........ 303/40

*Primary Examiner*—Douglas C. Butler
*Attorney, Agent, or Firm*—R. S. Visk

[57] ABSTRACT

A load-controlled brake pressure control unit for vehicle trailers including a load-weighing portion for operating a pressure control valve portion for effecting supply of brake-applying pressure via a relay valve according to vehicle load, a connection whereby brake-applying pressure is simultaneously supplied to the trailer brakes, and an emergency valve portion for effecting an emergency application in the event of separation or rupture of the trailer brake connecting line, all of the portions and components being housed in one casing.

10 Claims, 1 Drawing Figure

U.S. Patent     Dec. 6, 1983     4,418,965
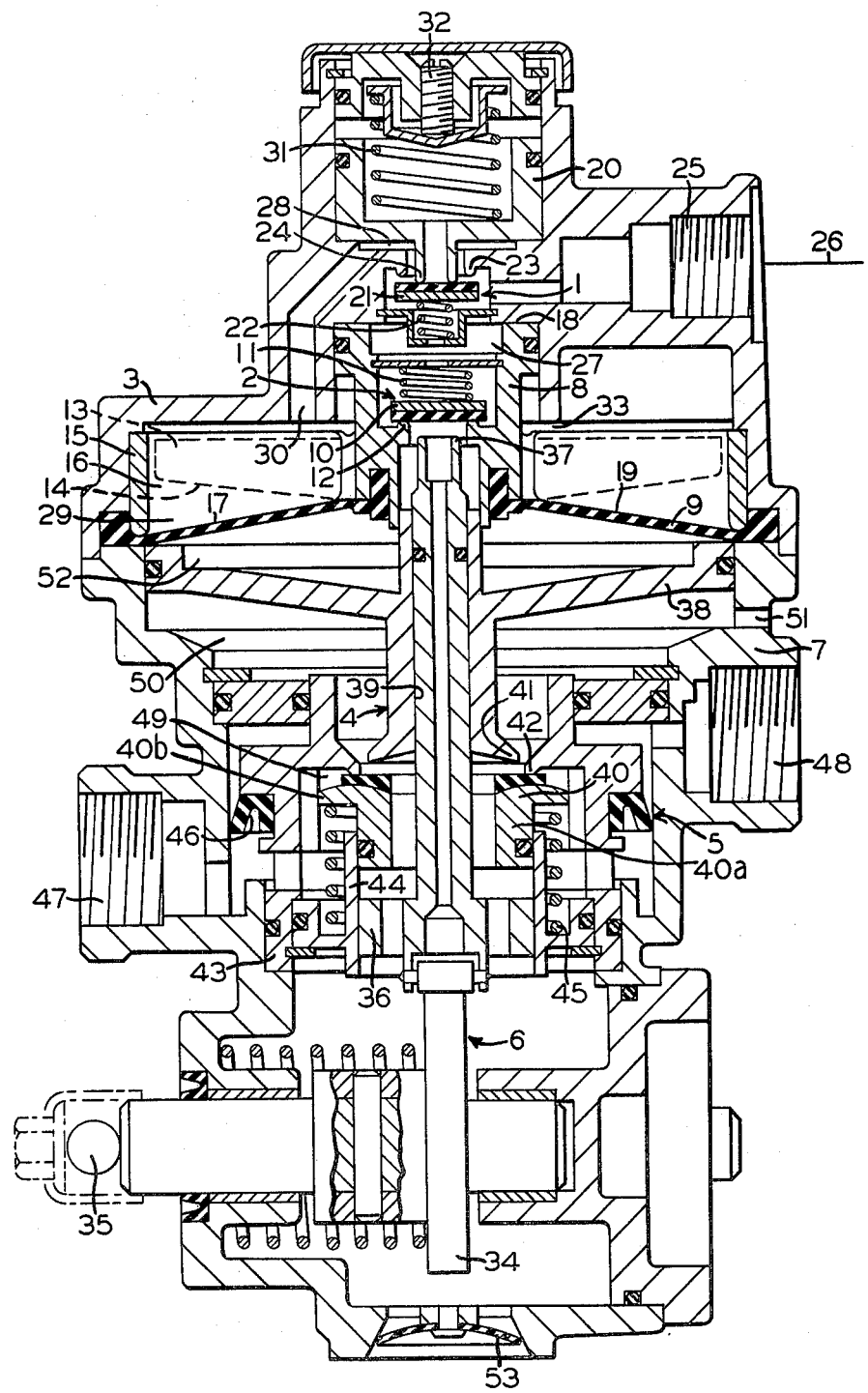

ial fins 13 are each radially attached to piston
LOAD-CONTROLLED BRAKE PRESSURE CONTROL UNIT

BACKGROUND OF THE INVENTION

The invention concerns a load-responsive fluid pressure operable control unit for pneumatic trailer brake systems.

There are presently known control units whose structure is such that the load-control function of the brake pressure occurs after operation of the relay valve. This system complies with requirements of certain regulatory standards with respect to response and pressure build-up time, and also with respect to emergency braking in the event of separation or rupture of the trailer brake pressure line.

Regulations which define the relation of braking ratio static friction coefficient and require an installation of automatic load-controlled brake pressure controls on commercial vehicles, are satisfied by some presently known brake pressure control units with respect to the friction characteristic.

The mentioned brake pressure control unit represents a device, which practically also fulfills the function of a trailer brake valve in addition to the described functions. However, the required structural measurements effect the dimensions of the device so as to necessitate a large housing. Attaining brief venting periods requires large cross-sectional dimensions for the combined control relay valve, specifically for the venting process. Large cross sections again require large structural dimensions, which again demands greater operating forces at the tappet and therefore a heavier structure of the components due to the considerable pressure increase. Since relatively high clearance results when this relatively advantageous valve system is used as a trailer brake valve, the emergency control system which is activated upon separation or rupturing of the trailer brake pressure line, is practically located on the valve system.

SUMMARY OF THE INVENTION

The invention is intended, therefore, to provide a brake pressure control unit for trailer vehicles of the initially mentioned type, whose structure is compact and which is capable of producing all specified functions of the known control unit.

According to the invention, therefore, integration of the emergency control features into a control system without any significant increase of the housing requires only that an additional connection opening be provided in the housing, which results in a compact and convenient valve unit whose outer dimensions are relatively small. Since the emergency control unit is located in the area of the relay valve (not at the load-controlled regulator unit), the control valve of the load-controlled regulator unit may be precisely controlled. Otherwise, the emergency brake piston of the emergency control unit would exhibit the sensitivity of the load-controlled regulator valve.

The invention will be described in detail as follows and as illustrated in the single FIGURE drawing.

DESCRIPTION AND OPERATION

As shown in the drawing, a servo valve 1 and a load-responsive brake pressure control valve 2 are operably disposed in an upper housing section 3. A relay valve 4, an emergency control system 5 and a load-controlled adjusting unit 6 for brake pressure control valve 2 are operably disposed in a lower housing section 7.

Brake pressure control valve 2 has a brake pressure differential control piston comprising a piston 8 and a diaphragm 9. A dual valve member 10, under tension of a spring 11, is operably disposed within a hollow portion of piston 8 and forms a supply valve with a valve seat 12 formed on piston 8. A plurality of equiangularly spaced radial fins 13 are each radially attached to piston 8 with lower edges 14 thereof facing toward diaphragm 9 to form part of a cone-shaped configuration.

An annular member 15 having a plurality of equiangularly spaced radial fins 16 is disposed in housing section 3 such that fins 13 may move within the spaces between fins 16 without contact therewith and whose lower edges 17 face toward diaphragm 9 to form an opposing cone-shaped configuration.

Differential piston 8–9 has an upper constant effective pressure area 18 and a lower variable effective pressure area 19, the latter varying with differential piston movement.

Servo valve 1 comprises a pilot piston 20, a double valve carrier 21, which is prestressed by a spring 22. Double valve carrier 21, along with a valve seat 23 formed internally of upper housing section 3, forms an intake valve and a discharge valve with an annular valve seat 24 formed on the lower end of pilot piston 20.

A port 25 formed in upper housing section 3, is adapted to be connected with a trailer brake line 26 which communicates with a pilot chamber 27 via a chamber 28 and intake valve 21–23. Pilot chamber 27 is directly in communication with a chamber 29 above diaphragm 9 via a passageway 30.

Pilot piston 20 is under compression of a spring 31, the compression of which is adjustable by a set screw 32.

Axial movement of brake pressure differential control piston 8–9 is limited by annular member 15 to an amount indicated at 33 with respect to piston 8.

Adjusting device 6 in lower housing section 7 essentially comprises a cam plate 34, which is rotated by a load-controlled adjusting lever 35 connected thereto. Cam plate 34 controls a partially hollow tappet 36. The upper end of tappet 36 forms an annular rib seat 37 which cooperates with valve member 10 to form a discharge valve 10–37.

Relay valve 4 comprises a relay piston 38 with a coaxial bore 39 formed therein and through which tappet 36 is axially slidable for effecting a load-controlled adjustment of brake pressure control valve 2. Relay valve 4 further comprises a double valve carrier 40, which cooperates with an annular valve seat 41 formed on the lower end of relay piston 38 to form a discharge valve 40–41, and with a seat 42 formed on an emergency brake piston 43 in lower housing section 7 to form an intake valve 40–42. A sleeve-shaped portion 40a of double valve carrier 40 is sealed and disposed in a piston bushing 44 which is disposed in the inner diameter of emergency brake piston 43, whereby a spring 45 compressed between an annular collar 40b of double valve carrier 40, urges said double valve carrier against intake valve seat 42. An annular lip 46 formed on a sealing member sealingly disposed between the outer surface of emergency brake piston 43 and the inner surface of housing section 7 prevents passage of fluid pressure in one direction (upwardly, as viewed in the drawing) while permitting flow of fluid pressure therepast in the opposite direction.

A port 47 connected to fluid pressure storage reservoir (not shown), is located in lower housing section 7 and is charged from said reservoir through a connection 48 past lip 46. In addition, connection 47 is connected with intake valve 40-42 via a chamber 49 and, via a chamber 50, with a delivery port 51 which connects with brake cylinders (not shown).

A pilot chamber 52, which may be charged with control pressure via supply valve 10-12, is located above relay piston 38.

Relay valve 4 is vented via discharge valve 40-41 and hollow double valve carrier 40-40a-40b past cam plate 34, via breather valve 53 to atmosphere.

Brake pressure control valve 2 and servo valve 1 are vented via the partially hollow tappet 36 and a transverse opening in tappet 36 into an exhaust chamber of relay valve 4.

Piston 8 is directly located on relay piston 38, so that chamber 52 is vented via the gap between piston 8 and relay piston 38.

The function of the brake pressure control unit is as follows: The brake system of the trailer, which is connected with the brake system of the motor vehicle, is controlled by a braking action of the motor vehicle brake valve via port 51 and the trailer brake line (not shown) connected thereto, and is charged via said trailer brake pressure line. The trailer brake system and its pressure tanks (not shown) are charged by the brake pressure control unit via connections 48 and 47, the lip 46 permitting the compressed air to flow from the former to the latter.

When brake control pressure is channelled via connection 25 over chamber 27 and past intake valve 21-23 into chamber 28 and via passageway 30 into chamber 29 above diaphragm 9, braking action of the vehicle brake valve occurs.

Pilot piston 20 moves upwardly against the force of spring 31, whereby intake valve 21-23 closes after brake control pressure acting on said pilot piston attains a predetermined degree.

The brake control pressure in chamber 27 simultaneously acts on the upper side of piston 8, as previously described, on the upper side of diaphragm 9 and therefore on the differential piston of brake pressure control valve 2 and forces it downwardly; dual valve member 10, following this movement under the influence of spring 11, seats on rib seat 37 on the upper end of tappet 36, which is the discharge valve seat, and therefore closes discharge valve 10-37 and opens intake valve 10-12 to cause control piston 8-9 to be moved further downwardly. The brake control pressure at connection 25 is now channelled over intake valve 10-12 past the gap between piston 8 and relay piston 38 into chamber 52 above said relay piston. Relay piston 38 is then moved downwardly and closes discharge valve 40-41 by seating on valve seat 41 and opens intake valve 40-42 with further downward movement, so that compressed air can flow into chamber 50 from the pressure storage reservoir (not shown) via connection 47 and into the brake cylinders via connection 51.

The pressure from the storage reservoir builds up under relay piston 38 and causes said relay piston to move upwardly upon exceeding the pressure in chamber 51 above said relay piston, and closes intake valve 40-42, which results in a final degree of brake application. Prevailing pressure in the brake cylinders corresponds with the pressure regulated by brake pressure control valve 2 relative to the vehicle load.

Brake control pressure decreases after completing the braking action, whereby relay piston 38 and piston 8 are moved into the final upper position and discharge valves 10-37 and 40-41 of the brake pressure control valve, and the relay valve are simultaneously opened; this compressed air can now escape to atmosphere via breather valve 53.

Pressure acting on the upper surfaces of emergency brake piston 43 is relieved in the event the trailer pressure lines at connection 48 break, so that pressure acting on the lower surfaces of emergency brake piston 43, which still exists in the system or in the pressure reservoir, moves emergency brake piston 43 upwardly with piston bushing 44. This upward movement is transferred to double valve carrier 40-40b by spring 45, so that valve seat 41 of relay piston 38 closes discharge valve 40-41 jointly with double valve carrier 40. Intake valve 40-42 is opened by the continued upward movement of emergency brake piston 43, and the trailer is thereby stopped by the pressure remaining in the system or in the pressure reservoir. Specifications of a trailer emergency brake system actuated automatically in the event of a break in the trailer pressure line are thereby complied with.

Having thus described the invention, what I claim as new and desire to secure by Letters Patent, is:

1. A load-controlled brake pressure control unit for pneumatic trailer brake systems, comprising:
    (a) a housing;
    (b) a brake pressure control piston operably disposed in said housing;
    (c) a brake pressure control valve having an intake valve and a discharge valve operable by said control piston;
    (d) a dual valve member operably disposed in the brake pressure control piston and forming, along with a first valve seat located on the control piston, the intake valve;
    (e) said dual valve member, in cooperation with a valve seat formed on an upper end of a tappet member, also forming the discharge valve, said tappet member having an axial passageway and being adjustable axially in relation to the vehicle weight, whereby the dual valve member is unseated from the first valve seat by said tappet member while simultaneously blocking the passageway;
    (f) a relay valve operably disposed in said housing and cooperating with said brake pressure control valve for providing trailer brake-applying pressure via a supply valve;
    (g) said relay valve being operated by a relay piston coaxially aligned with the control piston;
    (h) said tappet member being slidably and sealingly reciprocable coaxially through the relay piston; and
    (i) an emergency brake piston located in a lower housing section to serve as a valve seat for a discharge valve of the relay valve.

2. A load-controlled brake pressure control unit, as set forth in claim 1, wherein the emergency brake piston in the lower housing section is operably disposed between said relay piston and a load-adjusting cam.

3. A load-controlled brake pressure control unit, as set forth in claim 2, wherein said tappet member is coaxially reciprocably operable through the emergency brake piston.

4. A load-controlled brake pressure control unit, as set forth in claim 1, wherein said control piston includes a diaphragm having a variable effective pressure area in opposing relation to a constant effective pressure area, said diaphragm being connected to the control piston and such variable pressure area communicating with a brake control pressure to serve as the brake pressure control piston.

5. A load-controlled brake pressure control unit, as set forth in claim 1, wherein a brake control pressure acting on the variable pressure side of said brake pressure control piston is selectively communicated by operation of a prestressed servo valve.

6. A load-controlled brake pressure control unit, as set forth in claim 5, wherein the prestressed servo valve is located coaxially above the brake pressure control valve.

7. A load-controlled brake pressure control unit, as set forth in claim 1, wherein a second dual valve serves as a joint valve member for a second intake and discharge valve of the relay valve.

8. A load-controlled brake pressure control unit, as set forth in claim 7, wherein said tappet member is coaxially slidable through the second dual valve of the relay valve.

9. A load-controlled brake pressure control unit, as set forth in claim 7, wherein the emergency brake piston serves as a valve seat for the second dual valve.

10. A load-controlled brake pressure control unit, as set forth in claim 1, wherein the relay piston may be stressed in the opening direction of the relay valve by load-controlled discharge pressure of the control piston and in the opposite direction of brake-applying pressure.

* * * * *